July 29, 1947.  E. ORSHANSKY, JR  2,424,897
UNIVERSAL CONDUIT JOINT
Filed Dec. 12, 1944
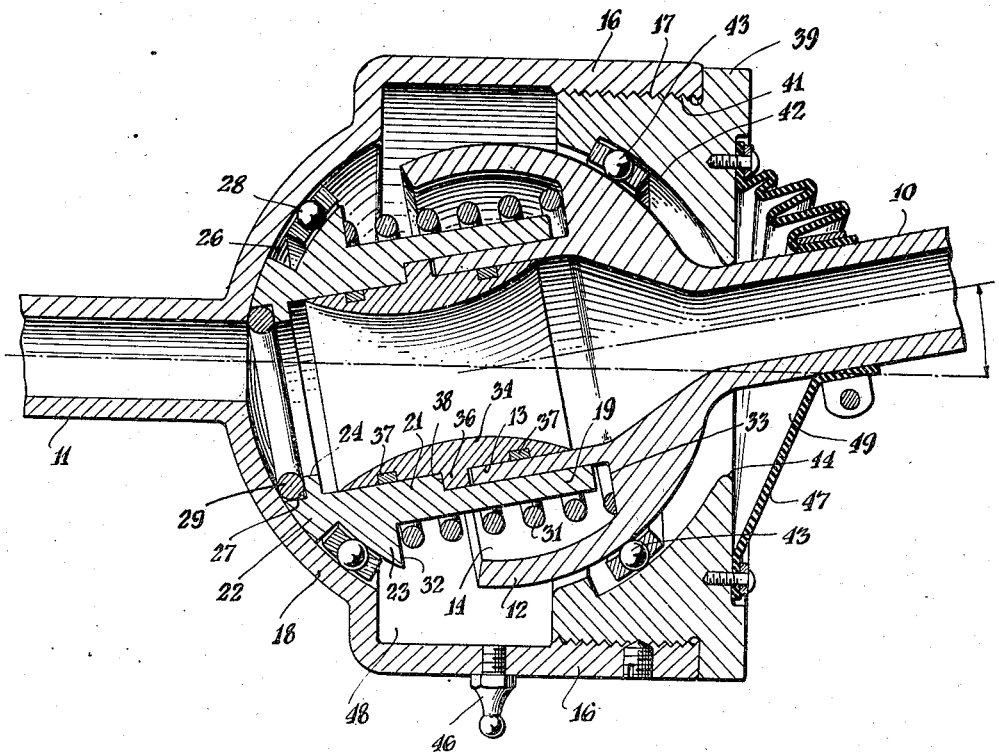
INVENTOR.
Elias Orshansky, Jr.
BY
ATTORNEYS Patented July 29, 1947

2,424,897

UNITED STATES PATENT OFFICE 2,424,897

UNIVERSAL CONDUIT JOINT

Elias Orshansky, Jr., Stamford, Conn., assignor to The Acrotorque Company, Stamford, Conn., a corporation of Connecticut Application December 12, 1944, Serial No. 567,803

10 Claims. (Cl. 285—95)

This invention relates to a universal conduit joint, particularly for use in high pressure fluid lines, and has for its primary object to provide a substantially balanced joint structure wherein high pressure forces are prevented from interfering with angular movement of the joint members.

Another object of the invention is to balance all hydraulic forces and thereby eliminate loads that would otherwise interfere with relative movement of the joint members.

Another object is to provide a universal joint which has no exposed bearing area upon which the hydraulic fluid may act, thereby enabling the joint members to be moved with equal freedom at any pressure.

Still another object is to provide a freely movable universal joint which is substantially free of leakage under high pressure.

Further objects will appear from the following description taken in connection with the accompanying drawing, which discloses a longitudinal sectional view of a universal conduit joint in which the joint members are shown disposed at an angle with respect to each other.

Referring now to the drawing, there is shown a ball or male conduit member 10 and a socket or female conduit member 11, both members being adapted for connection to a conduit line (not shown) in any suitable manner. Members 10 and 11 are also adapted for relative angular movement within permissible limits, the maximum divergence therebetween being illustrated as of approximately 10° in the drawings. The maximum divergence may, of course, be varied to suit the particular conduit installations. Male member 10 is formed with an enlarged bifurcated end, one projection 12 thereof being spherically shaped to provide an outer bearing apron and the other projection 13 being tubularly shaped, whereby an annular recess 14 is provided therebetween. Female member 11 is formed with an enlarged cup-shaped end 16 having internal threads 17 at the extremity thereof and with a spherically-shaped intermediate portion 18 adapted for bearing engagement along the inner surface thereof.

Upon the outer peripheral surface of tubular extension 13 and within the recess 14 is slidably mounted a tubular end 19, preferably of reduced section, of sleeve 21, the other end of which is provided with a bearing portion 22 complementary to that of bearing surface 18 with which it is slidably engageable. Spherically-shaped annular shoulder 23 and annular projecting ring 24 are also provided at the other end of sleeve 21 in order to provide annular recesses 26, 27, respectively, thereon. In recess 26 is mounted an anti-frictional bearing 28 of any suitable type for bearing engagement between complementary bearing surfaces 18 and 23. In recess 27 a sealing ring 29 of any suitable type, such as the customary "O" ring, is secured in any satisfactory manner as by a press-fit, so as to be movable with sleeve 21. Compression spring 31 having one end bearing against face 32 of shoulder 23 and the other end bearing against face 33 of conduit member 10, intermediate apron 12 and tubular extension 13, maintains sleeve 21 in bearing engagement against bearing surface 18 of conduit member 11. It is readily evident that anti-frictional bearing 28 facilitates relative movement between sleeve 21 and bearing surface 18 and that sealing ring 29 prevents escape of fluid between bearing surfaces 18 and 22, thereby confining the hydraulic pressures within the inner portion of the sleeve 21.

To seal the joint between sleeve 21 and tubular extension 13 an annular member or ring 34, having a longitudinally arcuate throat and a protuberance 36 and sealing rings 37 of any suitable material, such as neoprene, is mounted upon the inner peripheral surfaces of sleeve 21 and tubular extension 13. In addition, ring 34 maintains sleeve 21 and extension 13 in alignment, so that correct engagement between members 10 and 11 is always assured. As shown, protuberance 36 is disposed between an interior shoulder 38 of sleeve 21 and the end of tubular extension 13. It is thus seen that sealing rings 37 prevent escape of fluid through the juncture between sleeve 21 and tubular extension 13 and also prevent the hydraulic forces from acting upon the contiguous bearing surfaces of the joint and interfering with free relative movement between members 10, 11. A substantially balanced universal joint is therefore provided. It is to be noted that though hydraulic forces act upon ring 29 any interference to movement between the joint members is negligible.

A cap 39 having an external thread 41 for engagement with internal thread 17 closes the open end of the joint. Cap 39 has an interior spherically shaped surface 42 complementary to that of bearing apron 12, anti-frictional bearing 43 being interposed between bearing apron 12 and surface 42 to further facilitate movement between members 10 and 11. Annular shoulder 44 on cap 39 is of such diameter as to provide the proper amount of relative movement between conduit joint members 10 and 11.

Inasmuch as the hydraulic fluid is confined within the interior of the joint and therefore cannot be used for lubricating the bearings 28, 43, separate lubrication is externally furnished to the anti-frictional bearings 28, 43 via fitting 46 threadedly secured to the cup-shaped end 16 of member 11. Flexible boot 47, which is attached in any suitable manner to both cap 39 and conduit 10, in conjunction with sealing rings 29 and 37, confines the lubricating material within the area, generally represented by the numerals 48, 49.

In operation, ball member 10, including sleeve 21 and ring 34, is angularly movable in socket member 11, spring 31 maintaining a continuous contact pressure therebetween and anti-friction bearings 28, 43 reducing the frictional contact therebetween. Since the hydraulic forces are prevented from reacting with the contacting points, as noted hereinbefore, not only a balanced but also a substantially freely movable joint is provided.

While the invention has been shown and described as embodying certain features merely for the purpose of illustration, it is, of course, understood that various modifications may be made in the details thereof and that the features may be applied to many other and varied fields without departing from the scope of the invention as defined in the appended claims. For example, the sealing ring member 34 may be dispensed with, sealing means being interposed between the internal peripheral surface of sleeve 21 and external peripheral surface of tubular extension 13 of ball member 10.

What is claimed is:

1. In a universal conduit joint, the combination with a socket conduit member having a plurality of internal bearing surfaces, a ball conduit member having an external bearing surface complementary with one of said internal bearing surfaces, a tubular extension on said ball member, a sleeve adapted for slidable engagement with said tubular extension and with the other of said internal bearing surfaces, and sealing means interposed between said sleeve and said tubular extension and between said sleeve and the other of said internal bearing surfaces for providing a balanced joint.

2. In a universal conduit joint, the combination with a conduit member having a spherical inner bearing surface, a second conduit member having a tubular extension, a spring-pressed sleeve having at one end a spherical recess and a spherical bearing surface adaptable for engagement against said inner bearing surface, a tubular extension at the other end of said sleeve adaptable for sliding engagement along the external periphery of said first tubular extension, sealing means interposed between said inner bearing surface and said sleeve, a cap removably attached to said first conduit member, and an annular sealing member abutting the inner peripheral surfaces of said sleeve and first tubular extension.

3. In a universal conduit joint for a high pressure fluid line, the combination with a conduit member having a spherical inner bearing surface, a second conduit member having a tubular extension and a spherical bearing apron, a spring-pressed sleeve having a spherical bearing surface adaptable for engagement with said inner bearing surface, said sleeve telescopically cooperating with said tubular extension, sealing means interposed between said inner bearing surface and said sleeve, a cap having a spherical inner wall concentric with said apron, said cap being removably attached to said first conduit member, and sealing means abutting said sleeve and said first tubular extension.

4. In a universal conduit joint, the combination with a female conduit member having a cup-shaped end and a spherical inner bearing surface, a male conduit member having a tubular extension and a spherical bearing apron, a spring-pressed sleeve having at one end a spherical recess and a spherical bearing surface adaptable for engagement against said inner bearing surface, a tubular extension at the other end of said sleeve adaptable for sliding engagement along the external periphery of said first tubular extension, sealing means interposed between said inner bearing surface and said sleeve, a cap having a spherical inner wall concentric with said apron, said cap being removably attached to said first conduit member, anti-friction members interposed between said sleeve spherical recess and said spherical inner bearing surface and between said inner wall and said apron, and a sealed annular member internally abutting said sleeve and said first tubular extension.

5. In a universal conduit joint, the combination with a conduit member having a spherical inner bearing surface, a second conduit member having a tubular extension and a spherical bearing apron, a spring-pressed sleeve having at one end a spherical recess and a spherical bearing surface adaptable for engagement against said inner bearing surface, the other end of said sleeve telescopically cooperating with said tubular extension, a sealing ring on said sleeve for engagement against said inner bearing surface, a cap having a spherical inner wall concentric with said apron, said cap being removably attached to said first conduit member, anti-friction members interposed between said sleeve recess and said inner bearing surface and between said inner wall and said apron, a ring having an arcuate throat adapted to abut the internal peripheral surfaces of said sleeve and said first tubular extension, and sealing means interposed between said ring and said sleeve on the one hand and between said ring and said first extension on the other hand.

6. In a universal conduit joint, the combination with a female conduit member having a cup-shaped end and a spherical inner bearing surface, a male conduit member having a tubular extension and a spherical bearing apron, a spring-pressed sleeve having at one end a spherical recess and a spherical bearing surface adaptable for engagement against said inner bearing surface, a tubular extension at the other end of said sleeve adaptable for sliding engagement along the external periphery of said first tubular extension, sealing means interposed between said inner bearing surface and said sleeve, a cap having a spherical inner wall concentric with said apron, said cap being removably attached to said first conduit member, anti-friction members interposed between said sleeve spherical recess and said spherical inner bearing surface and between said inner wall and said apron, and means for lubricating said anti-friction members.

7. A universal conduit joint for a high pressure fluid line, comprising a pair of relatively movable outer and inner conduit members adapted for connection to conduits, a spring-biased sleeve slidably connected to said inner conduit member, said sleeve and said outer member having complementary spherical bearing faces permitting universal relative movement thereof, a sealing ring disposed on said sleeve and movable therewith for bearing engagement against said outer member, and sealing means interposed between said sleeve and said inner member, said sealing ring and said sealing means being so disposed as to prevent the fluid pressure of said line from acting upon said bearing faces and interfering with free movement of the conduit members.

8. A universal conduit joint, comprising a pair of relatively movable outer and inner conduit members adapted for connection to conduits, a spring-biased sleeve slidably connected to said inner conduit member, said sleeve and said outer member having complementary spherical bearing faces for permitting universal relative movement thereof, a sealing ring disposed on said sleeve and movable therewith for bearing engagement against said outer member, an annular sealing member for aligning said sleeve and said inner member, and a cap secured to said outer member, said cap and said inner member having complementary spherical bearing faces for permitting universal relative movement thereof.

9. A universal conduit joint, comprising a pair of relatively movable outer and inner conduit members adapted for connection to conduits, a spring-biased sleeve slidably connected to said inner conduit member and movable angularly therewith, said sleeve and said outer member having complementary spherical bearing faces for permitting universal relative movement thereof, sealing means between said sleeve and said outer member, a ring for aligning said sleeve and said inner member, sealing means interposed between said ring and said sleeve on the one hand and between said ring and said inner member on the other hand, and a cap secured to said outer member, said cap and said inner member having complementary spherical bearing faces for permitting universal relative movement thereof.

10. A balanced universal conduit joint for a high pressure fluid line, comprising a pair of relatively movable outer and inner conduit members adapted for connection to conduits, a spring-biased sleeve slidably connected to said inner conduit member, said sleeve and said outer member having complementary spherical bearing faces for permitting universal relative movement thereof, a sealing ring disposed on said sleeve and movable therewith for bearing engagement against said outer member, a metallic ring for aligning said sleeve and said inner member, sealing means interposed between said metallic ring and said sleeve on the one hand and between said metallic ring and said inner member on the other hand, said sealing ring and said sealing means being so disposed as to provide a readily movable joint in which the hydraulic forces of said fluid are balanced, and a cap secured to said outer member, said cap and said inner member having complementary spherical bearing faces for permitting universal relative movement thereto.

ELIAS ORSHANSKY, JR.

REFERENCES CITED

The following references are of record in the file of this patent:

UNITED STATES PATENTS

| Number | Name | Date |
| --- | --- | --- |
| 939,908 | Greenlaw | Nov. 9, 1909 |
| 1,915,100 | McLaughlin | June 20, 1933 |
| 1,510,755 | Weir | Oct. 7, 1924 |
| 1,001,117 | Adreon | Aug. 22, 1911 |
| 1,018,143 | Vissering | Feb. 20, 1912 |